(12) United States Patent
Lehl et al.

(10) Patent No.: US 10,028,492 B2
(45) Date of Patent: Jul. 24, 2018

(54) METHODS AND SYSTEMS FOR MAINTAINING A CONSTANT DEPTH

(71) Applicants: Jeremy Adam Lehl, Macomb, MI (US); Michael Bryan Ross Smith, Knoxville, TN (US)

(72) Inventors: Jeremy Adam Lehl, Macomb, MI (US); Michael Bryan Ross Smith, Knoxville, TN (US)

( * ) Notice: Subject to any disclaimer, the term of this patent is extended or adjusted under 35 U.S.C. 154(b) by 0 days.

(21) Appl. No.: 15/344,586

(22) Filed: Nov. 7, 2016

(65) Prior Publication Data

US 2017/0280693 A1    Oct. 5, 2017

Related U.S. Application Data (63) Continuation-in-part of application No. 15/090,623, filed on Apr. 5, 2016, now Pat. No. 9,738,361.

(51) Int. Cl.
| | |
|---|---|
| *A01K 91/20* | (2006.01) |
| *A01K 85/16* | (2006.01) |
| *A01K 97/00* | (2006.01) |
| *G01V 1/38* | (2006.01) |
| *B63G 8/18* | (2006.01) |
| *B63G 8/24* | (2006.01) |

(52) U.S. Cl.
CPC .............. *A01K 85/16* (2013.01); *A01K 97/00* (2013.01); *B63G 8/18* (2013.01); *B63G 8/24* (2013.01); *G01V 1/3826* (2013.01)

(58) Field of Classification Search
CPC ..... B63G 8/14; B63G 8/18; B63G 8/42; A01K 85/00; F42B 19/04; B63B 2723/00; G01V 1/3826
See application file for complete search history.

(56) References Cited

U.S. PATENT DOCUMENTS

| | | | | |
|---|---|---|---|---|
| 3,440,992 A | * | 4/1969 | Chance ................... | B63B 21/66 114/245 |
| 3,973,350 A | * | 8/1976 | England .................. | A01K 91/20 43/42.03 |
| 4,033,278 A | * | 7/1977 | Waters ................. | G01V 1/3826 114/245 |
| 4,658,750 A | * | 4/1987 | Malcosky ............ | G01N 29/032 114/242 |

* cited by examiner

*Primary Examiner* — Andrew Polay
(74) *Attorney, Agent, or Firm* — Fred Martin (57) ABSTRACT

Operating at constant depth, various embodiments are provided equipped with automatic depth-control mechanisms in dynamic devices such as lures and carriers that acquire and maintain a constant target depth when pulled through a medium such as water. The depth-control mechanism incorporates a mechanical pressure measurement of depth using a bladder with changing dimensionality and mechanical coupling to a variable angle dive plane. The measured pressure is compared with the target depth pressure causing the dive plane angle to adjust and converge to an adjustable target depth with forward motion due to retrieval or trolling. The dive plane extension is optionally a variable angle lip or bill protruding from the front of the lure or a pectoral fin-like configuration. Multi-purpose carriers are provided that can perform various underwater sensing and measuring tasks. Included are systems and methods for using a lure or platform equipped with a depth-controlling device.

11 Claims, 6 Drawing Sheets

METHODS AND SYSTEMS FOR MAINTAINING A CONSTANT DEPTH

CROSS REFERENCE TO RELATED APPLICATIONS

The present application is a continuation-in-part of co-pending U.S. application Ser. No. 15/090,623, filed Apr. 5, 2016. The disclosure of this application is incorporated by reference herein in its entirety.

TECHNICAL FIELD

This invention generally relates to devices, systems, and methods that have functional requirements associated with achieving and maintaining a constant depth in water while being retrieved, towed, or more generally "pulled."

BACKGROUND OF THE INVENTION

A need has existed for an inexpensive constant depth mechanism that can be scaled up or down in size to provide accurate depth-control for incorporating into fishing lures as well as other uses such as scalable multi-purpose carriers for mounting and carrying sensing and measurement devices for underwater operations photography, pH measurements, radiation monitoring, sound monitoring, temperature mapping, pollution mapping, or sea floor mapping while being retrieved, towed, trolled, or otherwise pulled.

With regard to fishing, in previous years the major fishing lures or plugs considered deep divers were oversized versions of the plugs that you would use in cast fishing. There was a slight problem with the concept. While a larger sized Hellbender, Bomber Waterdog, or MudBug (common brand names of diving lures) would reach deeper haunts when trolled, the same did not apply when casting the plugs. It was difficult to consistently get out the same amount of line on a cast and secondly it was problematic to maintain anywhere near the same speed of retrieval from cast to cast when compared to the consistent speeds one can achieve with trolling. The result of trying to accomplish this was that the best reels would prematurely wear out over time.

In approximately the last 10 years there have been an ever-increasing number of true deep diving baits. These have been developed through the application of elongated lips on plastic molded lugs, which in some cases have also been modified by having a slight bend at the end of the lip. This bend enhances the dive of the plug in the water by giving it a steeper dive angle upon retrieve. To a certain degree this concept might work on any plug that dives on retrieve. Some have actually altered the dive angle by adding weight to the front of the plug, thus customizing it. This was a difficult to accomplish without changing the tracking of the plug on retrieve. Alternately, the dive angle was increased by adding an over-sized treble in the front hook position to shift the center of mass forward. Unfortunately because of the larger hook, the lure will be less weedless.

Most deep diving plugs have a couple of things in common. The lip will be proportionally larger in ratio to the body size and the other feature is that many of these, when viewed from the front or back, will have a narrow body contour from side to side. The lip obviously aids in the dive, but its effect would be useless if the body wasn't able to cut through the water with less resistance. Another common characteristic of diving plugs is that plugs with wider wobbles on retrieve are less likely to go as deep on the same speed of retrieve as a comparable size plug which has a less pronounced wobble.

The depth to which a lure is supposed to dive has always been a subject to more variables or factors than the retrieval speed and dive angle of the lip. There has been a primary additional factor attributable to the size of line used in the company test. In the real world you weren't going to cast a 20-foot rated plug on six-pound test very many times due to the stress on the small diameter line and even fewer if you were in any place where there was underwater structure.

Regarding structure, many of the deep divers are going to be less prone to becoming entangled in underwater vegetation or structures. The reason for this is the same sharp diving angle is going to keep the hooks protected during retrieval by the body and the lip of the plug. If you simply release pressure upon feeling resistance, the plug will often float back off the hang-up.

If you are going to fish deep diving cranks it was advisable to use nothing less than a 6½-foot rod. When using the larger and deepest diving plugs it was advisable to actually go to a 7- or even a 7½-foot rod. These longer rods provide a maximum distance cast, and also reduce much of the shock from the lure pressure during retrieval (which isn't a bad concept since the other option would increase fatigue to the fisherman).

The gears have been reinforced on most quality reels so that you can get a good life expectancy even if you throw a lot of deep cranks. The higher ratio gear reels are preferable for the same reason to use a stiffer rod, to control slack and move the fish when needed.

Some who would fish with deep cranks do not like the effort of "driving" or reeling a lure to maximum diving depth. Well it doesn't have to float to be a deep crankbait. In fact those with count-down potential are also excellent deep cranks. About 95 percent of fishermen do not work swimming type baits such as Rat-L-Traps by letting them sink to the deeper water. Plugs such as these are only as effective as the fishermen's knowledge of the depth to which they let it sink. If a fishermen want to use deep crank lures to establish a reproducible pattern they must "count it down." While you have less control over the constant depth of a diver-type of crank you can much more easily control the depth on retrieve of a Trap or Hot Spot.

A common concern for fishermen using a crankbait lure is that they are going to hang up on underwater debris or vegetation due to the inability to maintain depth. As a consequence of being unable to maintain depth, lures are going to hang up, so it has been wise to use sufficiently heavy line to feel comfortable that they can get the lures loose. Due to the hang-up potential, fishermen are advised to invest in buying a lure retriever. Most tackle shops have various versions or they can be built from a saltwater lead and a couple of dog collar drop-chains dangling from the lead.

An alternate means for controlling constant bait depth is a downrigger. The downrigger is a winch-type mechanism that feeds cable off a rotating reel through a guide system along an extension arm. A weight is attached to the end of the cable and the line release is attached to the weight. The fishing line from an independent rod and reel is attached to the release mechanism on the downrigger cable. By lowering the weight (ball), you can drop the line down to the desired depth. A footage counter is connected to the reel unit to indicate the specific amount of cable that has been released. At the desired depth the reel is locked into place.

Downrigger models range from portable clamp on styles, permanent mounts, some with electronic motor retrieval systems capable of lifting downrigger weights of up to 10 lbs 100 feet down by a simple push of a button. Other new features on downriggers are networked with electronics, a speed sensor can be attached to the cable indicating how fast the lure is moving at that depth. Bottom tracking sonar systems using a transducer on the transom sends a programmed signal to the downrigger that will raise and lower automatically the weight off the bottom, or jig the weight up and down giving action to the lure with an auto setting. Multiple downriggers can be operated off of the same sonar signal working simultaneously.

Lead Core (Weighted Trolling Line) came on to the fishing scene during the 1970's as weighted trolling line. This allowed Salmon, Lake Trout, Steelhead and Walleye anglers the ability to use certain types of lures to reach depths were the fish are present. Lead Core is constructed of two components, the inner wire made of soft pliable lead and the outer sheath of nylon braid which is color coated every ten yards for metering purposes, referred to as the term colors. Recently a new environmentally safe non lead line was introduced using a metal alloy wire in lieu of lead. Weighted trolling lines are available in 100-200 yard spools ranging from 12 lb to 45 lb. test ratings.

The amount of weighted trolling line spooled on your reel is totally dependent on the species of fish you are targeting by the depth required. An example of this method can be observed on the Great Lakes where walleye anglers may use 30 yards of weighted line or three colors whereas a Salmon angler may spool the entire 200 yards or twenty colors. The approximate rule dependent on the pound-test is every two yards of weighted line will sink one foot. The only reel type to be used for weighted trolling line is a conventional level wind-trolling reel and the line capacity is based on the species (smaller for walleyes larger for salmon). In spooling the reel, a line backing should always be used as this helps to fill the reel to the proper line amount. The most popular line backing used today is the super braid which is tied to the weighted line using an Albright knot, after the weighted line is spooled, a monofilament/fluorocarbon leader is tied using a Uni-knot. (Note: When tying backing a leader to lead core, remove the inner wire) This entire line set-up is referred as "segmented" which when properly used places the weighted line and lure at the feeding depth of fish. Trolling weighted (lead core) line is a technical process requiring a high level of expertise and knowledge. If considering using this trolling technique, success would be best served if you research the fishery and species before purchasing the proper equipment.

Wire line is another trolling line option especially if fishing requires lures to go very deep. Wire lines come in a variety of choices, solid and stranded. Solid wire known as Monel is a metal-nickel-copper alloy, which will go deeper than stranded line based on the ultra-thin line diameter and weight. Stranded offers many versions made of stainless steel or copper, in cable-laid wire, 49 strand, three and seven strand wire some of these come with vinyl coatings used mainly as leader material.

Snap weights are an attached/removable weight system ideal in getting your bait down to suspended Walleyes, Salmon, Trout, Bass and Muskies when flat line trolling. The weight sizes are relatively heavy ½ to 8 oz. that snaps on to the fishing line by a spring tension clamp, the weight is secured on a metal ring below. Upon a fish strike the line is retrieved to the snap weight and unclipped from the line to fight the fish. With the various sizes of weights available, this method offers a range of different depth settings without having to re-rig the rod. Most anglers start by using the 50/50 system placing the snap weight halfway out on the line. Moving the snap weight closer to the lure increases the response to the movements of the boat and the rod while moving the weight farther away from the lure it becomes less responsive, but more influenced by the action of wind and waves. The farther back the snap weight is from the lure will reduce spooking the fish from biting. Snap weights can be used on braided line, low stretch monofilament/fluorocarbon and lead core line.

The present state of the art regarding a device, for example a lure, that will seek to achieve a constant depth while traveling through a body of water includes, but is not limited to, fishermen attempting to retrieve a lure via previously mentioned traditional methods, and/or troll a fishing lure that will seek and ultimately maintain a constant depth in the water. The purpose of attempting to target or acquire a specific depth in water while fishing (without special materials such as weighted or color coded line or weight snaps) is a typical desire of most fishermen due to the stratified depth behavior of fish.

Traditional crankbait lures are a type of fishing lure that, by virtue of an angled bill on the forward-most portion of the lure, succumb to a tendency to dive once pulled forward through the water either by retrieval from a stationary fisherman retrieving his cast or from a fisherman trolling the lure behind a fishing vessel. These lures are classified by depth which is a function of bill surface area, bill angle, rate of retrieval, weight of fishing line and angle of fishing line. These depth classifications apply to two main camps of fishing technique: Cast fishing (from shore, boat, dock, etc.) and trolling (from a boat in motion). For most cast fishing scenarios a crankbait lure assumes a general parabolic curve where the first portion of the retrieval is dedicated to the diving action of the lure. At some critical point (specific to each individual lure) the vertical forces of the fishing line overpower the diving forces of the bill and the lure begins its return to the surface. This method of retrieval requires much skill and technique on the fisherman and allows for a large margin of error when trying to target a specific depth. Conversely, in trolling there is well known and published data outlining specifics of the variables involved in accurately presenting your lure at its target or desired depth. These models, or dive curves, consider two major variables: trolling speed and amount of fishing line between the lure and the reel. As long as these two variables are known, the targeted trolling depth can be achieved with relative accuracy but the two variables must be held constant to achieve the desired depth.

Present methods using current products for depth-specific-fishing, while in motion, and require considerable amounts of skills and special materials as related to the retrieval/trolling speed of the lure and scope of the fishing line. Scope of the fishing line refers to the length of fishing line from the fisherman to the device and makes maintaining a constant depth at various retrieving or trolling speeds problematic without a constant depth mechanism.

A constant or automatic depth-control device is a device equipped with an automatic or constant depth-controlling mechanism. Many other applications other than fishing for constant depth devices are possible using special or general purpose carriers with constant depth mechanisms incorporated along with sensing and measurement devices for underwater operations including photography, pH measurements, radiation monitoring, sound monitoring, temperature mapping, pollution mapping, or sea floor mapping while being retrieved, towed, trolled, or otherwise pulled.

Based on the aforementioned needs and problems, there is a necessity for automatic depth-control mechanisms, devices, systems, and methods capable of achieving and then maintaining a constant depth while traveling through the water at various speeds. All this without special materials and requiring minimal skill on the part of the users to achieve and maintain a constant depth while performing an underwater task such as fishing, photography, sampling, mapping or data collection.

A dynamic dive plane, as applied to an automatic depth-control device ("dynamic lure") includes various end effector shapes or dynamic extensions such as a lip, bill, or fin design revolutionizes the various constituents of typical crankbait lure fishing techniques by eliminating many of the aforementioned variables.

In cast-fishing applications the dynamic lure will "seek" and "acquire" its target depth, but will maintain this target depth upon reaching it despite most techniques employed by the fisherman. In trolling applications, the two variables that define typical dive curves (speed and length of line) are eliminated by allowing the fisherman to travel at any reasonable trolling speed with any amount of line (above a certain critical length) and achieve the target depth.

The exact mechanisms and some of the various embodiments outlining these and other depth-control accomplishments follow, but the general concept is that by allowing the dynamic dive plane; lip, bill, or fin of this lure to dynamically react to pressure changes in the water column or depth, the lure will improve the accuracy of achieving and maintaining target depth and increase the lure's presentation time at target depth or in an alternative broader sense, the time at target depth for a multi-purpose carrier to perform a variety of tasks including sensing (such as for pH levels and $O_2$, or pollutant concentrations), photography, bottom depth mapping, fish attraction, and temperature mapping.

BRIEF DESCRIPTION OF THE INVENTION

Some or all of the above insights, needs, problems, and limitations that are attributed to the invention are summarized as follows:

The invention herein includes various embodiments, each incorporating or equipped with an automatic depth-control mechanism that acquires and maintains a constant depth when pulled through a medium such as water.

The automatic depth-control mechanism includes:
At least one bladder which may be reinforced or otherwise configured to vary size in preferably a single longitudinal direction due to water pressure and having a fixed termination at a proximal location attached to a body or housing, a variable termination of the bladder at a distal location attached to an inner lever arm in the at least one direction of the bladder size changes due to pressure, a dive plane member extending essentially orthogonal to the inner lever arm with a pivot point rotatively attached to the housing establishing a variable dive plane angle, and a set of at least one elongated depth-control member extending the dive plane member externally away from the housing for effecting depth-control. The automatic depth-control mechanism including the configuration of the bladder, inner lever arm pivoting around the pivot point establishing the dive plane member angle, and the at least one elongated depth-control member extending the dive plane member externally away from the housing interact to provide depth-control for an object wherein the preponderance of the mechanism is housed.

Regarding the dynamic operation of the automatic depth-control mechanism assuming that there is a forward motion during retrieval or trolling: When the measured pressure as indicated and communicated by the bladder compression is less than the pressure associated with a desired (target) depth, the mechanical coupling from the bladder causes the dive plane angle to increase downward toward the bottom resulting in an increased depth. When the measured pressure is greater than the pressure associated with a desired depth, the mechanical coupling from the bladder causes the dive plane angle to increase upwardly toward the surface resulting in a decreased depth.

Furthermore, the invention herein includes a variable target depth-control setting mechanism.

Furthermore, the invention herein includes systems with a mechanized lure, platform, multitasking device, or carrier that includes a pulling source, a line for pulling, and a depth-controlling device.

Furthermore, the invention herein includes methods for achieving and maintaining depth by using a depth-controlling device or carrier to perform various underwater tasks including sensing (such as for pH levels and $O_2$, or pollutant concentrations), photography, bottom depth mapping, fish attraction, and temperature mapping.

BRIEF DESCRIPTION OF THE DRAWINGS

The foregoing, and other aspects, and embodiments will be better understood from the following detailed description of the exemplary embodiments of the invention with reference to the drawings, in which.

DETAILED DESCRIPTION

Example embodiments of the invention will now be described more fully hereinafter with reference to the accompanying and incorporated by reference (cross-referenced) drawings, in which embodiments of the invention are shown. This invention may, however, be embodied in many different step sequences, forms, structures, or materials and should not be construed as limited to the embodiments set forth herein. Rather, these embodiments are provided so that this disclosure will be thorough and complete, and will fully convey the scope of the invention to those skilled in the art.

It should be noted that, as used in the specification and the appended claims, the singular forms "a" and "the" include plural referents, unless the context clearly dictates otherwise. Thus, for example, reference to "an array" or "the array" can include reference to one or more of such arrays.

The present invention embodies a device comprising a dynamic dive plane and mechanical linkage to a compressible bladder or void located inside a housing or body of the device, wherein the device is submersible in salt or fresh water and seeks to achieve and then maintain a constant depth in the water as the device is retrieved or towed through the water.

The depth-control mechanism incorporates a mechanical pressure measurement and control of the device's depth using a void, bladder, or optionally "reinforced bladder" with mechanical coupling or actuating functionality as the bladder or void changes shape due to the pressure. At least one aspect of the change of shape of the bladder or is mechanically coupled through one or more levers through a housing to a variable angle dive plane with external or end effectors. The external dive plane effectors are essentially one or more optional variable angle lips or bills protruding from the front of the device or lure. Alternatively, the dive plane end effectors are essentially a variable angle pectoral fin-like or flap type configuration protruding from the body or housing sides of the device or lure.

Figure 1:
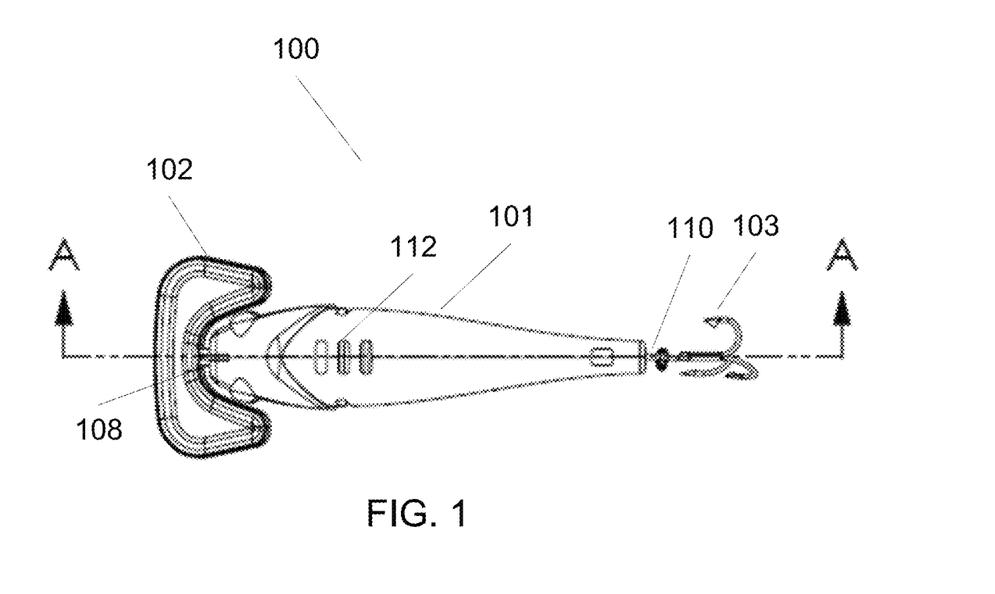
FIG. 1 is a top view of a fishing lure equipped with a depth-control mechanism controlling the angle of a lip-embodied dive plane with section A-A identified.

With reference to FIG. 1, a top view of an exemplary lure 100 is shown with a housing or body 101, a protruding lip or bill 102 establishing a dive plane, a dive plane mechanical linkage 108, a triple port set 112, a hook set 103, and a hook set termination 110. The port set 112 allows water to flow into the body 101 allowing pressure to be equalized between the outside and the inside of the body 101. This allows a pressure sensor inside the body 101 to measure and mechanically adjust the angle of the dive plane accordingly. The body 101 is formed generally to be pulled through water with a motion that is smooth or hydro-dynamic to simulate a live bait or minnow in order to attract and catch fish. The hook set 103 is a mechanical means for hooking, catching, and securing fish that have bitten the lure 100.

With continued reference to FIG. 1, the lure 100 embodies a depth-control device having a partially internal and partially external depth-control mechanism with the dive plane angle controlled based on internally sensed pressure. The actuator or end effector of the dive plane as shown is the lip or bill 102.

Figure 2:
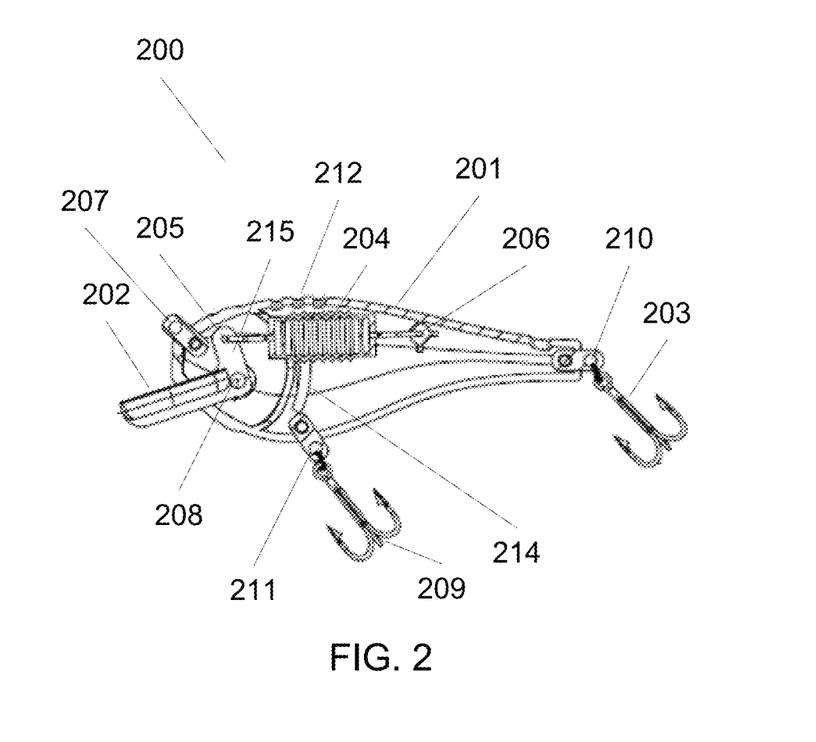
FIG. 2 is a cross section A-A view of the fishing lure illustrated in FIG. 1 showing the depth-control mechanism housed within the body of the lure.

With reference to FIG. 2, the exemplary lure 200 side view is shown as cross section A-A as indicated in FIG. 1. The cross sectioned body or housing 201 represents a half section of the overall outer body or housing 101 of the lure 100 exposing its internal configuration as well as a preponderance of its outer features hidden in FIG. 1. The outer A-A cross sectioned features of lure 200 include, a fishing line connector or eyelet 207, a protruding lip or bill 202 establishing a dive plane, dive plane mechanical linkage and pivot point 208, upper port set 212, side port 214, hook sets 203 and 209, and hook set terminations 210 and 211. The upper port set 212 and side ports 214 allow water to flow into the overall body 101 of FIG. 1 until pressure is equalized and maintained from the outside to the inside of the overall body 101. This allows a pressure sensor inside the overall body 101 to measure and mechanically adjust the angle of the dive plane.

With continuing reference to FIG. 2, the internal configuration cross sectioned features of lure 200 dive plane mechanism include a compressible void or reinforced bladder 204 with a fixed proximal termination 206 and a variably displaced distal termination 205, and a dive plane actuator pivot point 208 and a dive plane lip or bill 202.

Figure 3:
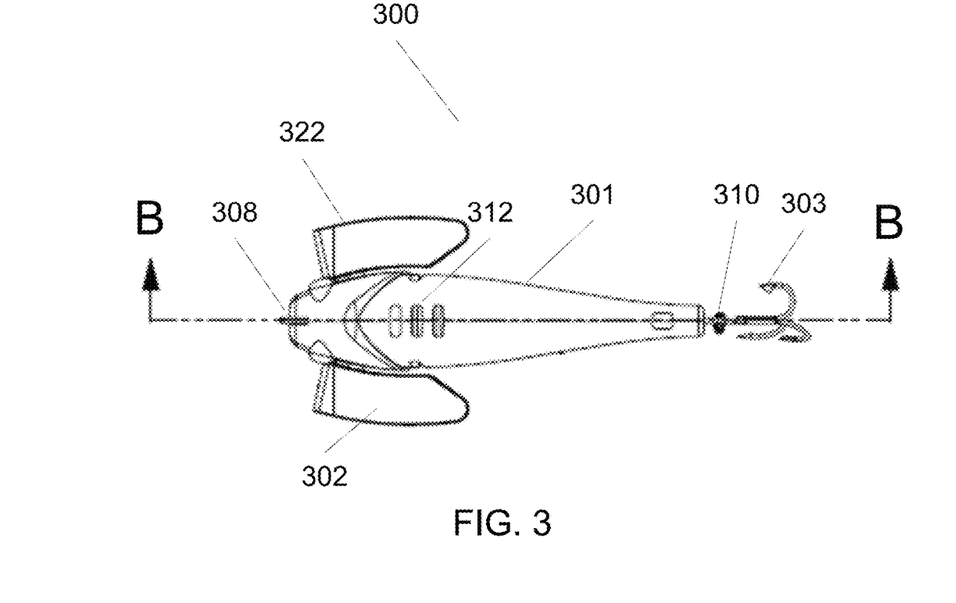
FIG. 3 is a top view of a fishing lure equipped with a depth-control mechanism controlling the angle of a set of pectoral fins embodied as a dive plane with section B-B identified.

With reference to FIG. 3, a top view of an exemplary lure 300 is shown with a housing or body 301, pectoral fins 302 and 322 establishing a dive plane, a dive plane mechanical linkage 308, a port 312, a hook set 303, and a hook set termination 310. The port set 312 allows water to flow into the body 301 until pressure is equalized from the outside to the inside of the body 301. This allows a pressure sensor inside the body 301 to measure and mechanically adjust the angle of the dive plane. The body 301 is formed generally to be pulled through water with a motion that is smooth or hydro-dynamic to simulate a live bait or minnow in order to attract and catch fish. The hook set 303 is a means for hooking, catching, and securing fish that have bitten the lure 300.

With continued reference to FIG. 3, the lure 300 embodies a depth-control device having a partially internal and partially external depth-control mechanism with the dive plane angle controlled based on internally sensed pressure. The actuator of the dive plane as shown as a set pectoral fin members 302 and 322.

Figure 4:
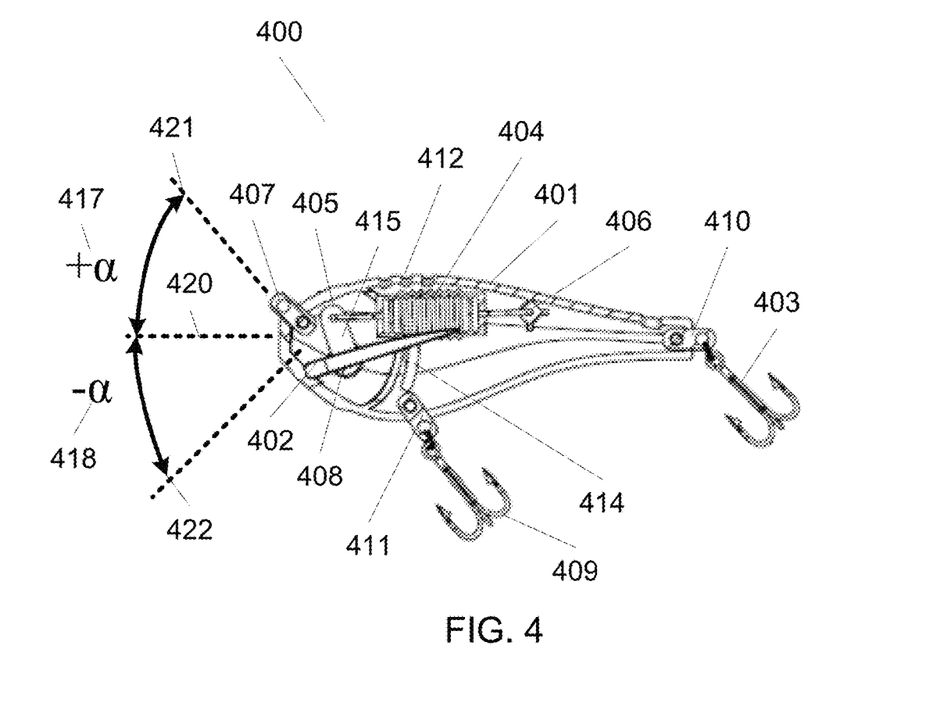
FIG. 4 is a cross section B-B view of the fishing lure illustrated in FIG. 3 showing the depth-control mechanism housed within the body of the lure.

With reference to FIG. 4, the exemplary lure 400 side view is shown as cross section A-A as indicated in FIG. 3. The cross sectioned body or housing 401 represents a half section of the overall outer body or housing 301 of the lure 300 exposing its internal configuration as well as a preponderance of its outer features hidden in FIG. 3. The outer B-B cross sectioned features of lure 400 include, a fishing line connector or eyelet 407, a set of pectoral fin members 402 and 432 (not shown) establishing a dive plane, dive plane mechanical linkage and pivot point 408, upper port set 412, side port set 414, hook sets 403 and 409, and hook set terminations 410 and 411. The upper port set 412 and side ports 414 allow water to flow into the overall body until pressure is equalized from the outside to the inside of the overall body. This equalized pressure allows a pressure sensor inside the overall body to measure and mechanically adjust the angle of the dive plane.

With continuing reference to FIG. 4, the fishing line connector or eyelet 407 is mounted on body 401 from an upper or forehead position with angle +α 417 of approximately 45 degrees as shown at 421 relative to the zero degree plane 420 of the body 401. The angular range of +α 417 may extend as high as 90 degrees in an exemplary embodiment of lure 400 depending on the overall shape and mass distribution of the body 401 to achieve optimal hydrodynamic performance. The fishing line connector or eyelet 407 may alternately be mounted on body 401 from a lower or throat position with angle −α 418 of approximately 45 degrees as shown at 422 relative to the zero-degree plane 420 of the body 401. The angular range of −α 418 may extend negatively as much as −90 degrees in an exemplary embodiment of lure 400 depending on the overall shape and mass distribution of the body 401 to achieve optimal hydrodynamic performance. Optimal hydrodynamic performance is defined as the ability of the lure 400 (or others embodied herein) to seek and acquire a target depth with a minimal anomalies such as instability or delayed target depth acquisition at a wide range of pulling or forward velocities.

With continuing reference to FIG. 4, the internal configuration cross sectioned features of lure 400 dive plane mechanism include a compressible void or reinforced bladder 404 with a fixed proximal termination 406 and a variably displaced and rotatively terminated distal termination 405, a dive plane actuator pivot point 408 and an at least one dive plane extended member or exemplary pectoral fin 402.

Figure 5:
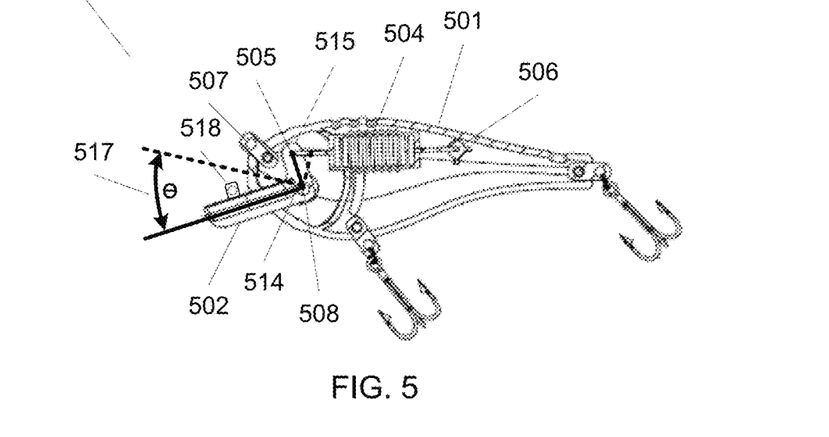
FIG. 5 is a cross section B-B view of the fishing lure illustrated in FIG. 2 showing the dynamic potential of the depth-control mechanism housed within the body of the lure.

With reference to FIG. 5 the exemplary lure 500 is shown as a similar A-A cross-sectional view as FIG. 2 with only the features identified as needed to describe the operation of lures equipped with a depth-control mechanism including members 504, 505, 506, 508, 515, and elongated member 502, and potential range for dive plane angle theta (θ) 517.

Regarding the exemplary embodiments illustrated in FIGS. 1-5; several aspects of the present invention are in common as referenced in FIG. 5. One such commonality is the depth-control mechanism and how it works and functions as follows.

With continuing reference to FIG. 5 and to the more general considerations of all automatic depth-control mechanisms commonly used herein by all lures and depth-control devices alike herein, the following detailed functional description of the dynamics of automatic depth-control devices apply: At least one bladder 504 which may be reinforced or otherwise configured to vary in size in at least one direction based on water pressure having a fixed termination at a proximal location 506 attached to a body or housing, a variable termination of the bladder at a distal location 505 rotatively attached to an inner lever arm 515 pivoting at pivot point 508 due to the at least one direction of the bladder size change due to pressure, a dive plane member 514 extending essentially orthogonally from the inner lever arm at or near the pivot point 508 rotatively attached to the housing establishing a dive plane angle θ 517, and a set of at least one elongated depth-control member 502 extending externally from the dive plane member 514 and away from the housing 501 for effecting depth-control.

With reference to FIG. 5, the dive plane exterior shown as an exemplary lip or bill 502 is designed so that at the surface of the water, the attitude of the dive plane 502 is angled down at some angle θ 517. The device 500 moves in a forward motion (direction to the left as shown in FIG. 5) from a forward pulling motion by a line attached to line termination eyelet or lug or pick point 507 at a forward location on the body or housing 501. In an alternative embodiment, the device 500 moves in a forward motion, (direction to the left as shown in FIG. 5), from a forward pulling motion by a line attached at or near the center of the lip or bill 502 on the upper side as shown in FIG. 5 at a lug, termination eyelet, or pick point 518. The dive plane's angle of attack θ 517 in relation to the forward motion causes the device to descend in the water. As the device descends, the increasing depth of the device experiences an increase in ambient pressure which causes the compressible void or bladder 504 to compress. The compression of the internal compressible void or bladder 504 causes the inner lever arm 515 at termination point 505 of the dive plane mechanism to be pulled from its original position toward the compressing bladder since the opposing end of the void or bladder 504 is terminated and fixated at 506 on the body or housing 501. This pulling motion from the bladder to the lever arm 515 causes the dive plane to rotate clockwise about a pivot point 508, which decreases the dive plane's angle of attack. The decreased angle of attack, as related to the dive plane, lessens the dive force imparted on the device, thereby decreasing the tendency of the device or lure 500 to descend further in the water. Once the device or lure 500 has reached the target depth and the dive plane 502 is at an angle of attack that imparts no vertical dive forces, any rise of the device or lure 500 in the water causes the compressible void or bladder to expand which pushes the inner lever arm 515 forward imparting a counter-clockwise rotation. This forward or counter-clockwise motion of the lever arm causes the angle of attack of the dive plane to increase thus resulting in the dive force causing the device or lure 500 to dive deeper in the water to reacquire the target depth. If the device or lure 500 surpasses the target depth by going deeper than the target depth in the water, the compressible void or bladder 504 responds by pulling the inner lever arm 515 of the dive plane toward the void or bladder 504 imparting a clockwise rotation. This pulling or clockwise motion of the inner lever arm 515 continues to rotate the dive plane clockwise reducing θ 517 past the angle where there are no vertical dive forces imparted on the device and to an angle that causes the dive plane to exert an upward or corrective force on the device. This upward force compels the device to return to the previously surpassed target depth.

Figure 6A:
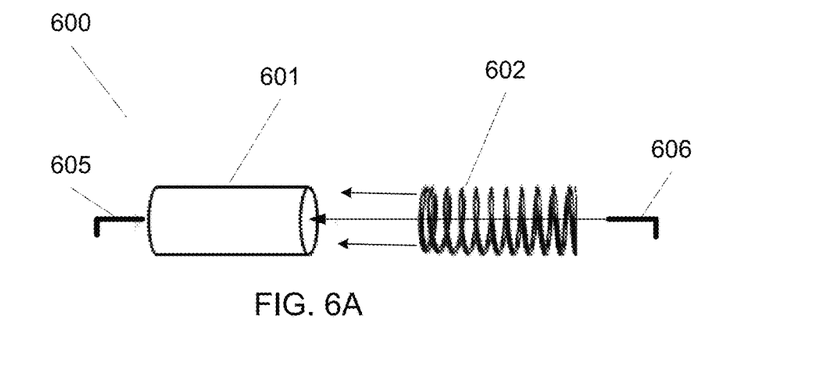
FIG. 6A illustrates an exemplary assembly of a bladder-spring combination.

With reference to FIG. 6A, a compressible flexible bladder 601 is constructed using silicon or any flexible material capable of performing the pre-described purposes of dynamic response to changes in ambient pressure imparted by the corresponding changes in water depth. A reinforcement member 602 in the form of a spring or equivalent with regard to maintaining radial or cylindrical shape of the flexible bladder (resulting in a bellows-like behavior) when bonded to or molded together with the flexible bladder 601. Two bladder attachment members 605 and 606 are bonded to or molded into the ends of the bladder 601 before, during, or after the reinforcement member 602 is bonded or molded to or into the flexible bladder 601.

Figure 6B:
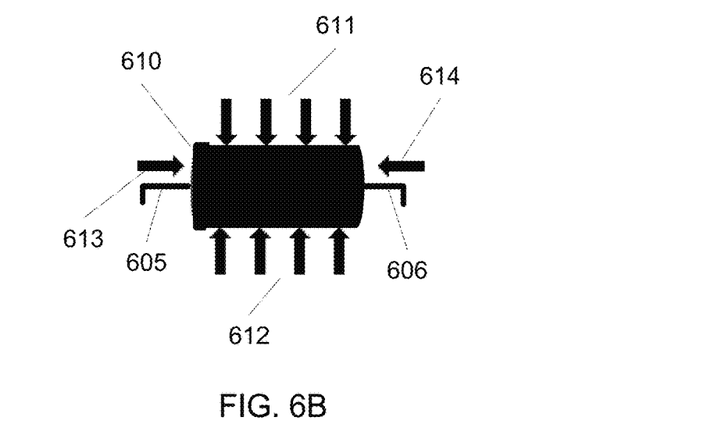
FIG. 6B illustrates an exemplary assembled bladder-spring combination actuator and inward pressure vectors causing deflection of the combination.

With regard to FIG. 6B, an exemplary reinforced bladder mechanism 610 is illustrated with downward directional pressure arrows 611 and upward directional pressure arrows 612 to demonstrate the added resistance to radial deflection due to the exemplary reinforcing member 602. Horizontal pressure arrows 613 and 614 demonstrate the freedom for the reinforced bladder 610 to expand and contract horizontally while the radial dimension remains stable under pressure. The reinforced bladder 610 results in bladder size changes due to pressure directed to a single longitudinal direction.

With continuing reference to FIG. 6B and to FIG. 5, the mechanism 610 provides dynamic pressure measuring and actuation capability when the termination ends 605 and 606 of the reinforced bladder 610 are attached as shown in FIG. 5 wherein one end of the corresponding reinforced bladder 504 is attached to the body 501 at connection point 506 (corresponding to 606 in FIG. 6B) and the other end is rotatively attached to the inner lever arm 515 at connection point 505 (corresponding to 605 in FIG. 6B).

Figures 7A, 7B:
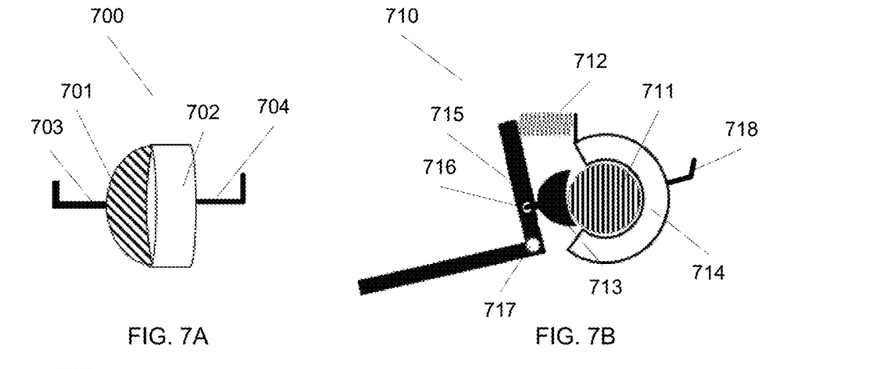
FIG. 7A illustrates an exemplary diaphragm actuator.
FIG. 7B illustrates an exemplary spherical bladder with tension spring actuator.

With reference to FIG. 7A, an exemplary diaphragm bladder mechanism 700 is shown wherein a compression of the bladder or diaphragm 701 is driven by increasing ambient pressures in the water column with the aft (right) portion 702 rigidly formed and mounted. The flexing of the bladder or diaphragm 701 is attached to connection member 703 that it pushes or pulls. The connection members 703 and 704 are attached shown in a FIG. 5 scenario wherein one end of the corresponding reinforced bladder 704 would be attached to the body 501 at connection point 506 and the other end 703 would be attached to the inner lever arm 515 at connection point 505.

With reference to FIG. 7B, an exemplary spherical bladder with tension spring mechanism 710 is shown wherein a compression of the spherical bladder or void 711 is driven by increasing ambient pressures in the water column wherein the spherical void of the bladder 711 is what prevents a tension spring 712 from pulling a "plunger" 713 into the retaining volume 714 occupied by the bladder 711. As the lure or depth-control object descends, the bladder 711 compresses, and the plunger 713 is pulled into the retaining volume member 714 by the spring 712 which pivots the bill assembly inner arm 715 about the pivot point 717 by pulling on termination point 716 causing a clockwise rotation of the inner arm 715 with the fixed termination 718 terminated into a lure internal body termination point as in 506 of FIG. 5. The clockwise rotation of the inner arm 715 decreases the dive plane angle thus correcting for a depth below the target depth.

With continued reference to FIG. 7B, instead of a spring, another option is to embed a magnet in the retaining volume (opposite the plunger 713) and make the plunger 713 face be a magnet (with opposite pole facing the pole of the other embedded magnet). As the bladder collapses, the magnetic attraction of the two magnets draws the plunger 713 into the retaining volume 714 thus mimicking the spring 712 force and the overall action of the spring version above.

Figure 7C:
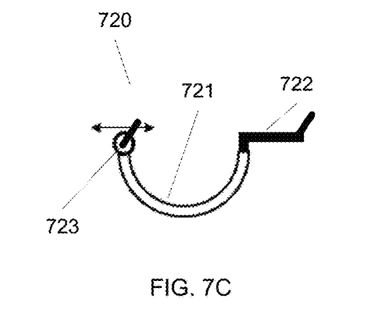
FIG. 7C illustrates an exemplary Bourdon tube system actuator.

With reference to FIG. 7C, an exemplary Bourdon tube system 720 is shown wherein a hollow plastic polymer, copper, brass, or other-metal tube or coil 721 is closed at both ends and formed into a portion of a full coil. The coil 721 is attached to the lure body at the aft (fixed) termination end 722 and allowed to remain free to move at the forward (variable) end termination 723. This forward-most (leftmost) point of the coil 723 includes optionally an eyelet or other attachment method to link the tube to a dive plane/bill assembly similar to the current design shown in FIG. 5. As the air inside the coil or tube compresses, the forward-most (left-most) point 723 pulls aft (right) some distance corresponding to water depth. As the air inside the tube expands (ascending in the water column) the forward-most (leftmost) point of the coil or tube 723 will move forward (left).

Figure 7D:
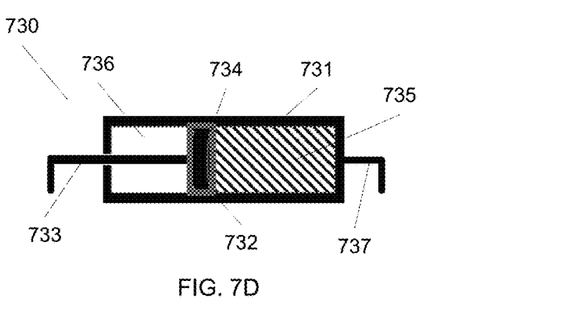
FIG. 7D illustrates an exemplary plunger-piston actuator.

With reference to FIG. 7D, an exemplary plunger/piston system 730 wherein this system is includes a rigid cylinder 731 is sealed at the aft end cavity 735 and open towards the forward end cavity 736. A plunger 732 is affixed to a shaft 733 and indexed inside the cylinder 731. A rubber, plastic, or other suitable material 734 creates a water-tight tight seal between the water column cavity 736 and the inside of the cylinder 735. The volume of the cylinder 735 is filled with air/gas and the plunger seal 734 prevents water from entering the volume of the cylinder 735. The forward portion of the shaft 733 (outside the cylinder) is affixed to the inner lever pivot arm and the termination member 737 is affixed to the body similarly to the concept as shown in FIG. 5.

Figure 7E:
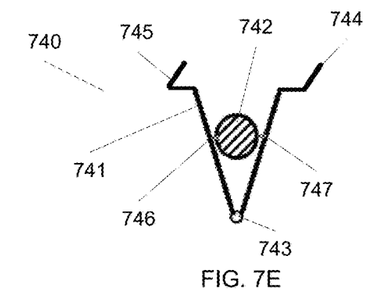
FIG. 7E-7F illustrate V-shaped bladder mechanisms with attached bladder actuators.
Figure 7F:
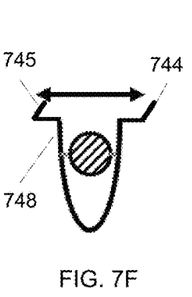
Figure 7G:
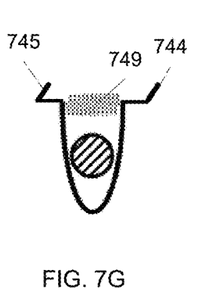
FIG. 7G illustrates V-shaped bladder mechanisms with unattached bladder with an attached compression spring actuators.

With reference to FIG. 7E, an exemplary v-shaped bladder mechanism 740 v-shaped apparatus 741 encasing a bladder 742 that is attached at 746 and 747 to the outer apparatus 741. This apparatus could be hinged 743 as in FIG. 7E or leaf spring (or "living hinge") style as in FIG. 7F and FIG. 7G. The pick points would attach to the body at the rear pick point or termination member 744 and the forward pick point would attach to the inner lever pivot arm at termination member 745. The bladder in FIG. 7E and FIG. 7F is physically attached to the spring/hinge apparatus thus drawing the apparatus 741 inward as the bladder 742 compresses. Conversely as the bladder 742 expands, the outer apparatus would be allowed to "opened" back up. In FIG. 7G the bladder is not connected to the outer apparatus and tension spring 749 draws the outer apparatus inward as the bladder 742 compresses. The leaf or living spring style in FIG. 7G naturally expands as the bladder expands.

Figure 7H:
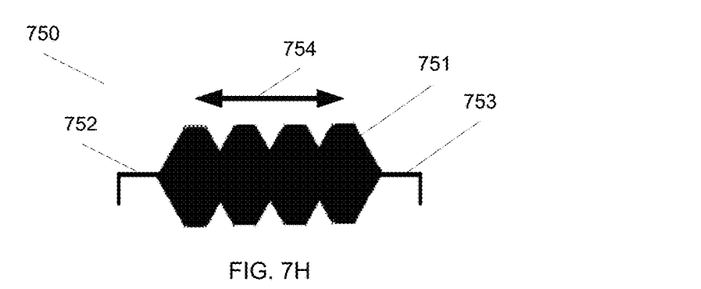
FIG. 7H illustrates a V-shaped bellows type actuator.

With reference to FIG. 7H, a bellows mechanism 750 is shown wherein changes in ambient pressure cause the bellows mechanism 750 to compress or expand. The bladder section inside is a flexible membrane that responds to pressure changes 754, while the rigid outer shell 751 encases the bladder adding durability and resistance to punctures. As the pressure increases the entire bellows collapses inward (752 moving towards 753) and the pick point attached to the body 753 as shown in FIG. 5 remains stationary while the pick point attached to inner lever pivot arm 752 moves with the compressive behavior of the bellow system.

Example bladder materials with various properties and/or benefits:
1. Latex: Abrasive and tear resistant.
2. Nitrile: More tear resistant than latex.
3. Vulcanized Poly Vinyl Chloride (PVC): UV stable.
4. Vulcanized Thermoplastic Elastomer (TPE): UV stable.
5. Silicone(s), silicone compounds or two part silicones: Keeps a relatively constant durometer (hardness) and elasticity under large temperature changes, relatively tear resistant.

Figure 8A:
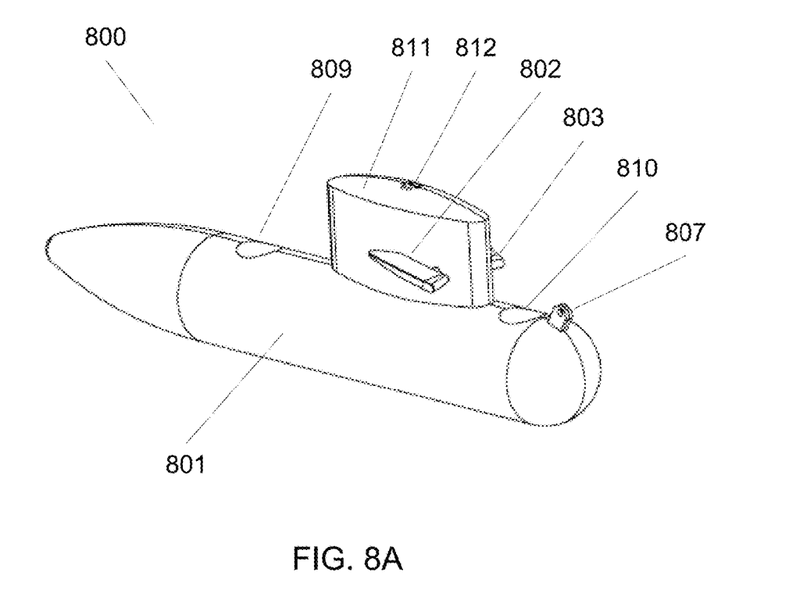
FIG. 8A and FIG. 8B illustrate perspective and a sectional views, respectively, of a depth-controlled carrier, platform, or multitasking embodiment.

With reference to FIG. 8A, an automatic depth-controlled multi-tasking device, carrier, or platform 800 is illustrated in perspective view as an exemplary submarine form including a scalable base, carrier, or platform housing 801 and a scalable tower housing 811. It is understood that many other hydrodynamic forms of carriers or platforms that efficiently move through water can be fitted with an automatic depth-control mechanism of this invention. A line attachment lug or eyelet 807 is used as a connection point for a pulling line (not shown) to provide forward motion through water or fluid. The port 812 is provided to allow water pressure into the cavity for the depth-control mechanism inside tower or appendage 811. Depth-control members; wing, wings, flap, flaps, pectoral-like fins, or elevators 802 and 803 form the dive plane used by the carrier or platform 800 to control depth. As the dive plane angle is automatically adjusted or modulated by the depth-control mechanism (shown in FIG. 8B) and mechanically coupled to the right depth-control member 802 and the left depth-control member 803. The payload chambers 809 and 810 in the base 801 shown in FIG. 8A are used to contain or mount various exemplary payloads such as sensing and measurement devices for underwater operations including photography, pH measurements, radiation monitoring, sound monitoring, temperature mapping, pollution mapping, or sea floor mapping while being retrieved, towed, trolled, or otherwise pulled. Payload chambers 809 and 810 are shown in FIG. 8A with essentially circular upper openings on platform housing 801 corresponding to essentially cylindrical chamber shapes extending downward. The essentially cylindrical payload chamber shapes of payload chambers 809 and 810 extend from respective upper platform housing surface openings continuously downward until reaching bottom surface openings (not shown in FIG. 8A but is verifiable in FIG. 8B for corresponding payload chambers 909/910) on the bottom surface of platform housing 801. The upper and lower surface openings allow upper and lower access to the payload chambers for mounting sensing or measurement devices. The sensing devices once mounted and contained within the payload chambers may sense accordingly.

Figure 8B:
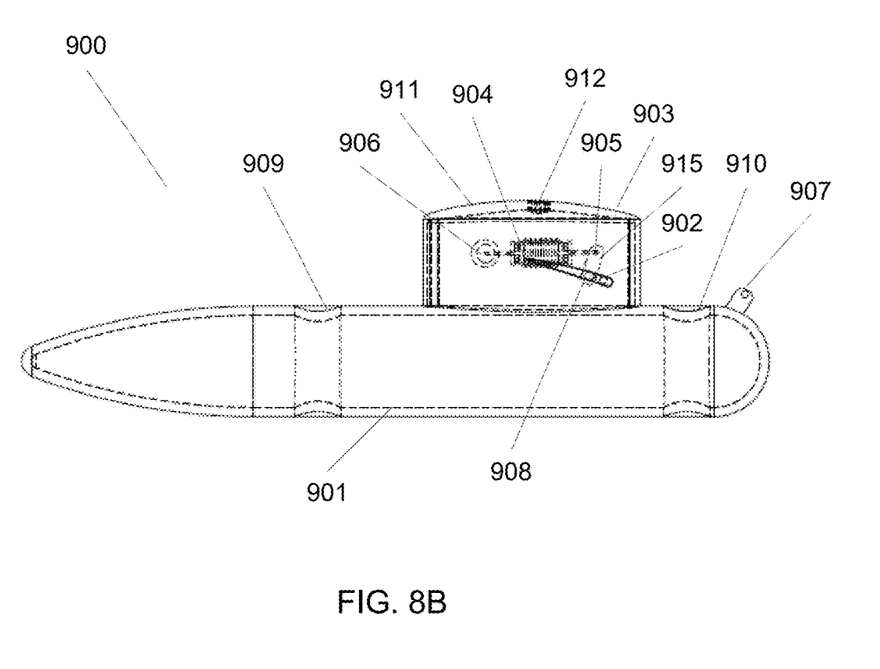

With reference to FIG. 8B, an automatic depth-controlled multitasking device, carrier, or platform 900 is illustrated in perspective view as an exemplary submarine form including a scalable base, carrier, or platform housing 901 and a scalable tower housing 911. It is understood that many other hydrodynamic forms of carriers or platforms that efficiently move through water can be fitted with an automatic depth-control mechanism of this invention.

With continuing reference to FIG. 8B, a line termination lug or eyelet 907 is used as a connection point for a pulling line (not shown) to provide forward motion through water or fluid. The port 912 is provided to allow water pressure into the cavity for the depth-control mechanism inside tower or appendage 911. Depth-control members; flaps, pectoral-like fins, or elevators 902 and 903 (hidden) form a portion of the dive plane used by the carrier or platform 900 to control depth. As the dive plane angle is automatically adjusted or modulated by the depth-control mechanism and mechanically coupled to the right depth-control member 902 and the left depth-control member 903 (hidden). The exemplary payload chambers 909 and 910 in the base 901 are used to contain or mount various exemplary payloads such as at least one sensing and measurement device for underwater operations including temperature mapping, pollution mapping, and sea floor mapping while being retrieved, towed, trolled, or otherwise pulled. Payload chambers 909 and 910 are shown in cross-sectional view FIG. 9A as cross-sectional details on platform housing 901 corresponding to essentially cylindrical chamber shapes extending from respective upper surface openings of the platform housing continuously downward away from the tower 911 until reaching distal bottom openings on the bottom surface of platform housing 901. The upper and lower payload chamber openings allow upper and lower access to the payload chambers for mounting sensing or measurement devices. It follows logically and geometrically that the sensing devices once mounted and contained within the payload chambers may optionally sense upwardly, downwardly, or both given that the upward direction and side of the platform housing 901 is established by the tower 911 as viewed in FIGS. 8A and 9A.

With continuing reference to FIG. 8B, the volume of the compressible void or bladder 904 extends and contracts based on water pressure between fixed proximal point 906 and a variable distal point at an inner lever arm point 905. The inner lever arm 915 rotates in relation to the pivot point 908 to dictate the dive plane angle as mechanically extended depth-control members 902 and 903 (hidden) and eventual target depth of the multitasking, carrier or platform device 900.

With continuing reference to FIG. 8B, in exemplary embodiments, the carrier or platform device or multitasking device 900 may be used for sensing or measurement or as a fishing lure or attractant or for dispensing attractants while maintaining a constant depth and traveling horizontally through water regardless of retrieval or trolling speed. Other exemplary embodiments include those forms that have no tower or appendage 911 and wherein the automatic depth-control mechanism of integrated mechanical components 902, 904, 905, 906, and 908 is located within the base 901. The body of the multi-tasking device or carrier or platform 900 may be made from any material capable of forming and encasing the appropriate mechanisms required for the pre-described purposes or intended uses.

Figure 9A:
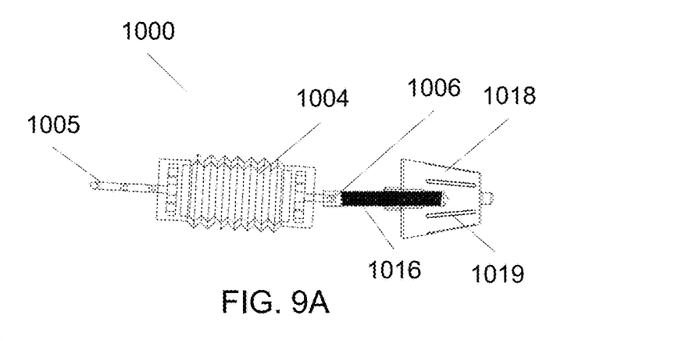
FIG. 9A illustrates a variable depth-control setting mechanism.

With reference to FIG. 9A, a variable target depth-control setting mechanism 1000 is shown including a bladder 1004 that links through member 1005 to a variable dive plane member (not shown) corresponding to FIG. 5 bladder 504 rotatively terminated at 505 at inner lever arm 515. This termination scenario of FIG. 9A is also corresponding to the rotatively terminated bladder shown in FIG. 2 bladder 204 rotatively terminated at 205 at inner lever arm 215 and FIG. 4 bladder 404 rotatively terminated at 405 at inner lever arm 415.

With continuing reference to FIG. 9A, the termination bladder 1004 also links in opposition to 1005 through an extendable and retractable connection point 1006 to a depth setting member 1016. The depth setting member 1016 is extendable and retractable based on a mechanical setting of a depth setting dial 1018. The depth setting dial 1018 is rotated to a target depth setting position. The target depth setting dial 1018 position is held into a desired or selected rotational position using frictional force or using a set of detents that may produce a clicking action when adjusted or rotated. The target depth setting dial 1018 includes ribs or slots 1019 to aid in rotating the dial and to provide visual indication of the presence of the dial so that a user would readily recognize the location and operational aspects of the dial. The target depth setting dial 1018 includes a threaded interface to the extendable and retractable depth setting member 1016 which adjusts a basis position for the bladder 1004 at termination point 1006. It is understood that the bladder 1004 can be of any exemplary form or embodiment as specified herein including exemplary bladder mechanisms 7A-7H and others.

Figure 9B:
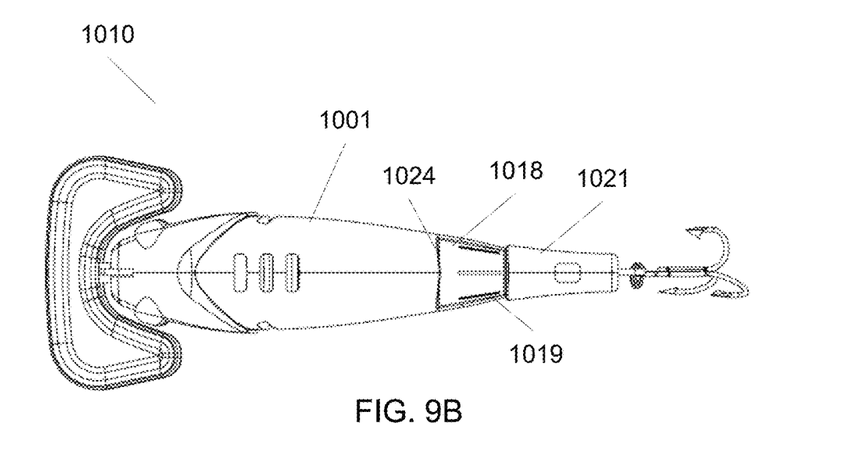
FIG. 9B-9C illustrate top and side views respectively of a lure equipped with a variable depth-control adjustment setting mechanism.

An indication of the dial position is provided for the user to associate the position of the dial with the target depth as a setting. With reference to FIG. 9A-9B, a variable depth lure 1010 is shown equipped with a control setting mechanism 1000. The dial 1018 is exposed and accessible through a cutout or window 1024 in the body 1001. The tail section 1021 of the body 1001 is adjacent to the dial 1018. As the dial 1018 is rotated or adjusted for a target depth it extends or retracts the depth setting member 1016 which adjusts a basis position for the bladder 1004 at termination point 1006.

Figure 9C:
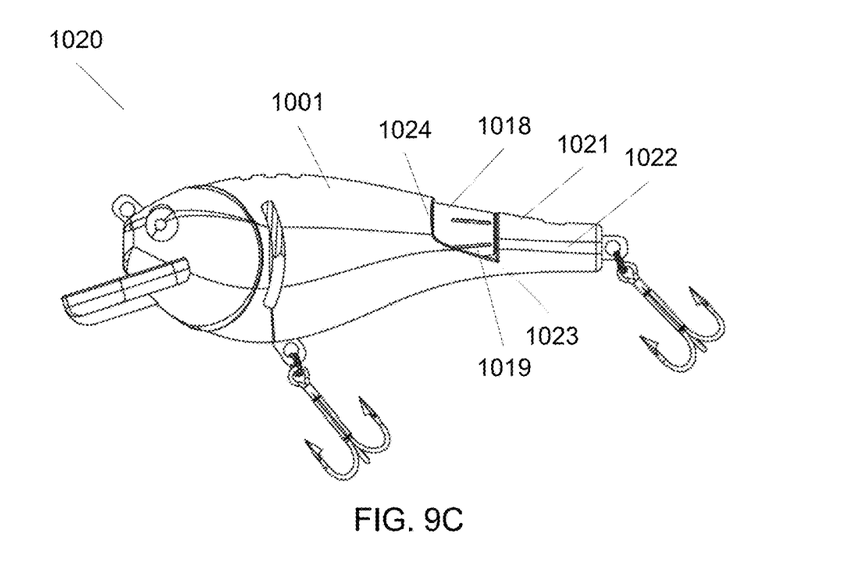

With reference to FIG. 9A-9C, a variable depth lure 1020 is shown equipped with a control setting mechanism 1000. The body of the lure 1001 is attached to tail section 1021 through a partial extension of the body 1001 at section 1023 adjacent to the cutout or window 1024.

A method of making an automatic depth-control device includes designing a body based on intended use including body size, body shape, fixed attachment locations, and any user mountable chambers for payloads. The intended use may be fishing or making underwater measurements or sensing for example.

An automatic depth-control device includes any one of reinforced, diaphragm, spherical, Bourdon, plunger/piston, v-shaped, helical spring, living hinge, leaf spring or bellows bladder mechanism.

To accomplish an intended use and satisfy a particular category of need, sizing an automatic depth-control mechanism is needed for mounting inside the depth-control device based on required depths, the mass and shape of the body, and the shape, size, and mass of the fixed attachments and any mounted payloads. Larger bodies require larger and more robust mechanisms.

Assembling an exemplary automatic depth-control device includes assembling the automatic depth-control mechanism to the interior of the body, assembling a variable target depth-control setting mechanism to the interior of the body, assembling the partially assembled body sections to form a single enclosed body, assembling the fixed attachments to the exterior of the body comprising a line termination eyelet, and setting a target depth of the lure with a target depth adjustment dial (for devices with variable depth options).

Example housing or body materials with various properties and/or benefits:
1. ABS Plastics: Aesthetically pleasing sheen, highly resistant to impact, easily used in injection molding. Can be made UV stable.
2. Nylons: Readily machinable (even though this would most likely not be machined).
3. Acetel: Relatively UV resistant.
4. Acrylics: Rigid, but susceptible to shattering.
5. Polycarbonates: Durable, high impact resistance.
6. Polypropylenes: Inexpensive. High flexural strength.
7. "Glass Filled" Thermoplastics: Extremely rigid. There are many "glass filled" materials used to improve rigidity.
8. UV Curing Resins: Expensive, and not ideal for manufacturing, used mainly for prototyping.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:
1. An automatic depth-control fishing lure comprising:
an automatic depth-control mechanism comprising:
a sealed bladder configured to vary size in at least one direction directly without vent wherein ambient water pressure is outside of the bladder;
a variable termination of the bladder at a distal location attached to an inner lever arm in the at least one direction of the bladder size change due to ambient water pressure outside of the bladder;
a control setting mechanism comprising;
a variable target depth-control setting comprising:
the bladder linked in opposition to the distal variable termination through the bladder to a proximal extendable and retractable connection point attached to a depth setting member comprising a mechanical setting of a rotatable target depth setting dial further comprising clicking detents and any one of depth setting ribs and slots;
a dive plane member extending essentially orthogonal to the inner lever arm with a pivot point rotatively attached to the housing establishing a dive plane angle;
a set of at least one elongated depth-control member extending the dive plane member externally away from the housing for effecting depth-control;
the automatic depth-control mechanism wherein the configuration of the bladder, inner lever arm pivoting around the pivot point establishing the dive plane angle, and the at least one elongated depth-control member extending the dive plane member externally away from the housing interact to provide depth-control for an object wherein the preponderance of the mechanism is housed as it is pulled through water; and
the automatic depth-control mechanism wherein the depth-control is provided by acquiring a target depth and maintaining the target depth as a result of the dive plane angle of the mechanism increasing when the lure is too shallow and decreasing the dive plane angle when the lure is too deep in the water as compared with the target depth.

2. The fishing lure of claim 1, wherein the elongated depth-control member is any of a lip, bill, pectoral fin, pectoral fins, flap, or flaps angled at the dive angle as part of the automatic depth-control mechanism.

3. The fishing lure of claim 1, wherein the housing is made of any of ABS, Nylon, Acetel, Acrylic, polycarbonate, polypropylene, or glass filled thermoplastic.

4. The fishing lure of claim 1, further comprising a reinforced bladder wherein the bladder size changes due to ambient pressure outside of the bladder are directed to a single longitudinal direction.

5. A constant depth carrier comprising:
an automatic depth-control mechanism comprising:
a seal bladder configured to vary size in at least one direction directly without vent wherein ambient water pressure is outside of the bladder;
a variable termination of the bladder at a distal location attached to an inner lever arm in the at least one direction of the bladder size change due to ambient water pressure outside of the bladder;
a control setting mechanism comprising:
a variable target depth-control setting comprising:
the bladder linked in opposition to the distal variable termination through the bladder to a proximal extendable and retractable connection point attached to a depth setting member comprising a mechanical setting of a rotatable target depth setting dial further comprising clicking detents and any one of depth setting ribs and slots;
a dive plane member extending essentially orthogonal to the inner lever arm with a pivot point rotatively attached to the housing establishing a dive plane angle;
a set of at least one elongated depth-control member extending the dive plane member externally away from the housing for effecting depth-control;
the automatic depth-control mechanism wherein the configuration of the bladder, inner lever arm pivoting around the pivot point establishing the dive plane angle, and the at least one elongated depth-control member extending the dive plane member externally away from the housing interact to provide depth-control for an object wherein the preponderance of the mechanism is housed as it is pulled through water;
the automatic depth-control mechanism wherein the depth-control is provided by acquiring a target depth and maintaining the target depth as a result of the dive plane angle of the mechanism increasing when the carrier is too shallow and decreasing the dive plane angle when the carrier is too deep in the water as compared with the target depth; and the carrier comprising a platform housing further comprising one or more essentially cylindrical payload chambers extending from an upper surface opening of the platform housing through the carrier to a bottom surface opening of the platform housing.

6. The carrier of claim 5, wherein the elongated depth-control member is any of lip, bill, pectoral fin, pectoral fins, wing, wings, elevators, flap, or flaps angled at the dive angle as part of the automatic depth-control mechanism.

7. The carrier of claim 5, further comprising a sealed reinforced bladder wherein the bladder size changes directly without vent due to ambient water pressure outside of the bladder are directed to a single longitudinal direction.

8. An automatic depth-control system for acquiring and maintaining a target depth, comprising:
  a line for pulling an automatic depth-control device attached to a line termination eyelet at a forward location of the automatic depth-control device housing;
  wherein the automatic depth-control device houses an automatic depth-control mechanism;
  wherein the depth-control mechanism controls a dive plane according to a dive angle determined by a sealed bladder and communicated rotatively through a dive plane member to an elongated depth-control member essentially external to the automatic depth-control device housing;
  wherein the dive angle as communicated to the elongated depth-control member provides depth-control varies directly without vent wherein ambient water pressure applied to the outside of the sealed bladder as compared to a pressure associated with a target depth; and
  wherein the target depth is achieved and maintained during pulling motion with the dive plane angle increasing when the depth is less than the target depth and the dive plane angle decreasing when the depth is greater than the target depth.

9. The automatic depth-control system of claim 8, further comprising a variable target depth-control setting wherein the bladder is linked in opposition to a distal variable termination through the bladder to a proximal extendable and retractable connection point attached to a depth setting member comprising a mechanical setting of a rotatable target depth setting dial further comprising clicking detents and any one of depth setting ribs and slots.

10. The automatic depth-control system of claim 8, wherein the automated depth-control device is a fishing lure.

11. The automatic depth-control system of claim 8, wherein the automated depth-control device is a multi-purpose carrier comprised of an essentially cylindrical chamber extending from an upper surface opening of the platform housing through the carrier to a bottom surface opening of the platform housing.

* * * * *